United States Patent [19]

Bekele

[11] Patent Number: 5,914,194

[45] Date of Patent: *Jun. 22, 1999

[54] EXTRUDABLE VINYLIDENE CHLORIDE POLYMERIC FILM

[75] Inventor: Solomon Bekele, Taylors, S.C.

[73] Assignee: Cryovac, Inc., Duncan, S.C.

[*] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/768,738

[22] Filed: Dec. 6, 1996

Related U.S. Application Data

[60] Continuation of application No. 08/486,566, Jun. 7, 1995, abandoned, which is a division of application No. 07/991,762, Dec. 17, 1992, abandoned.

[51] Int. Cl.$^6$ ..................................................... B32B 27/08
[52] U.S. Cl. ............................................ 428/518; 524/394
[58] Field of Search .............................. 428/518; 524/394

[56] References Cited

U.S. PATENT DOCUMENTS

| | | | |
|---|---|---|---|
| 2,605,244 | 7/1952 | Matlack et al. | 260/23 |
| 3,524,795 | 8/1970 | Peterson | 161/165 |
| 4,112,181 | 9/1978 | Baird, Jr. et al. | 428/336 |
| 4,320,175 | 3/1982 | Hisazumi et al. | 428/518 |
| 4,418,168 | 11/1983 | Johnson | 524/109 |
| 4,686,148 | 8/1987 | Havens | 428/520 |
| 4,714,638 | 12/1987 | Lustig et al. | 428/35 |
| 4,865,908 | 9/1989 | Liu et al. | 428/248 |
| 5,071,893 | 12/1991 | Takida et al. | 524/114 |
| 5,084,500 | 1/1992 | Yamada et al. | 524/417 |
| 5,202,188 | 4/1993 | Bekele | 428/414 |
| 5,679,465 | 10/1997 | Bekele | 428/474.4 |

FOREIGN PATENT DOCUMENTS

| | | |
|---|---|---|
| 478964 | 11/1975 | Australia . |
| 3605405 | 12/1987 | Germany . |
| 62-285928 | 12/1987 | Japan . |
| WO89/03858 | 5/1989 | WIPO . |
| WO91/08260 | 6/1991 | WIPO . |

*Primary Examiner*—Peter D. Mulcahy
*Attorney, Agent, or Firm*—David G. Burleson

[57] ABSTRACT

A vinylidene chloride film with improved processing properties such as good thermal stability, enhanced extrudability and reduced stickiness to metal surfaces is made from a vinylidene chloride polymer or copolymer and up to about 2.0% by weight of a soap of a fatty acid as a processing aid.

19 Claims, No Drawings

EXTRUDABLE VINYLIDENE CHLORIDE POLYMERIC FILM

This is Continuation of Ser. No. 08/486,566 filed Jun. 7, 1995 now abandoned which is a Divisional Application of application Ser. No. 07/991,762, filed Dec. 17, 1992 now abandoned.

BACKGROUND OF THE INVENTION

(1) Field of The Invention

This invention relates to a composition made from vinylidene chloride polymers or copolymers. More particularly, this invention relates to a vinylidene chloride composition having enhanced thermal stability and improved oxygen barrier properties, and to mono-layer and multi-layer packaging films having a layer of vinylidene chloride polymer or copolymer and to a method for making the films.

(2) Description of the Prior Art

Flexible thermoplastic packaging films made of vinylidene chloride copolymer, hereinafter referred to generally as PVDC (such materials are also commonly known as "saran") have been used for a long time to package food products which include cheese, fresh and processed meats, and a wide variety of other food and nonfood items. An example of such films is disclosed in U.S. Pat. No. 2,919,059 to Sporka.

A later and more satisfactory method of producing a multi-layer film having a PVDC layer is disclosed in U.S. Pat. No. 4,112,181, to Baird. This patent describes a method of co-extruding a tubular film wherein the walls of the tube have at least three layers, including a PVDC center layer. The tubular film is subsequently biaxially oriented.

Another satisfactory method of producing a multi-layer film having a PVDC barrier layer is disclosed in U.S. Pat. No. 3,741,253 to Brax et al, which discloses a multi-layer, biaxially oriented film. This film is made by an extrusion coating process in which a substrate layer or layers of a polymer such as polyethylene or ethylene vinyl acetate copolymer is extruded in the form of a tube, cross-linked by irradiation, and inflated. A layer of PVDC is extrusion coated onto the inflated tubing, and another layer or layers of polymer is simultaneously or sequentially extrusion coated onto the PVDC. After cooling, this multi-layer tubular structure is flattened and rolled up. Then, the tube is inflated, and heated to its orientation temperature, thereby biaxially orienting the film. The bubble is rapidly cooled to set the orientation. This process produces a shrinkable barrier film with low oxygen permeability.

It is standard practice that for PVDC to be successfully extruded at commercial rates, but to do so the vinylidene chloride copolymers must be stabilized and plasticized. One plasticizer/stabilizer combination is the liquid stabilizer, epichlorohydrin/ bisphenol A, an epoxy resin, and the plasticizer, 2-ethyl hexyl diphenyl phosphate. Other known liquid stabilizers include epoxy compounds, such as epoxidized linseed oil and epoxidized soybean oil and citrates. Note also that U.S. Pat. No. 4,714,638 to Lustig et al. discloses using dibutyl sebacte or epoxidized soybean oil as a conventional plasticizer for PVDC-MA barrier films. Also of interest is U.S. Pat. No. 4,320,175 to Hisazumi et al, which shows a PVDC layer of reduced viscosity heat-pressure laminated to another PVDC layer. Epoxy compounds are used as stabilizers for the PVDC. For clarity, it is noted that sometimes the art refers to the epoxy compounds as plasticizers instead of stabilizers.

In Canadian Patent No. 968,689, to Gillio-tos et al, the effect of plasticizers, such as dibutyl sebacate on the barrier properties of a PVDC barrier layer in a multi-layer thermoplastic packaging film is described. First, the Gillio-tos et al patent discloses that homopolymers of vinylidene chloride cannot be converted into film by conventional extrusion techniques because they decompose very rapidly at the temperature of extrusion. Second, by copolymerizing vinylidene chloride with minor amounts of one or more other monomers such as vinyl chloride, methyl acrylate, etc. it is possible to produce copolymers which, when mixed with suitable plasticizers, can be extruded into films which can be oriented by stretching to give heat shrinkable films for packaging, particularly for packaging food. As stated in Gillio-tos et al, vinylidene chloride copolymers need to be plasticized so that they can be extruded and stretched into oriented films at commercial rates. The greater the proportion of plasticizer, the lower the viscosity and the easier the polymer is to extrude and orient and the better the abuse resistance of the final product. On the other hand, the oxygen permeability of the final product also increases with increasing plasticizer content and for many purposes, especially packaging food, it is vital that the oxygen permeability is low. For current commercial practices permeability below 100 cc./24 hours/m$^2$/atmosphere at room temperature is expected and a permeability below 50 is highly desirable. The test for oxygen transmission is conducted as per ASTM D3985.

Also of interest are the following patents which show various additives for PVDC. U.S. Pat. No. 4,401,788 to Hiyoshi et al, shows a PVDC latex with an anionic surfactant, a nonionic surfactant, and a cationic surfactant. U.S. Pat. No. 4,418,168, to Johnson, shows stabilizing particulate PVDC by coating thereon a dispersion of tetrasodium pyrophophate (TSPP) in liquid plasticizer such as epoxidized soybean oil and epoxidized linseed oil. German Patent No. 3,605,405, shows five-layer films with a PVDC core layer, wherein the EVA adhesion layers on each side of the PVDC core layer contain TSPP to heat stabilize the PVDC core layer. U.S. Pat. No. 3,524,795, to Peterson, shows multiple layer PVDC films and mentions typical plasticizers for PVDC being acetal tributyl citrate, epoxidized soybean oil, and dibutyl sebacate.

U.S. Pat. Nos. 4,686,148, and 4,698,111, both to Havens disclose the addition of glycerin and a plasticizer such as epoxidized soybean oil to a vinylidene chloride polymeric composition to lower oxygen permeability and enhance thermal stability of a film having a plasticized layer of vinylidene chloride polymer.

It is an object of the present invention to provide a vinylidene chloride copolymer composition which can be extruded with reduced plasticizer and/or stabilizer.

Another object of the present invention to provide a vinylidene chloride copolymer composition which has low oxygen transmission.

It is another object of the present invention to provide a film wherein the PVDC layer is thick enough to be an effective gas barrier but thin enough so that it is not adversely affected to any significant extent by irradiation used to cross-link layers which are cross-linkable and adjacent to the PVDC layer in a multi-layer film.

Still another object of the present invention is to improve the thermal stability of vinylidene chloride copolymers and to lessen their tendency to degrade while being extruded.

Yet still another object of the present invention is to increase the extrusion rate of vinylidene chloride copolymer compositions.

A still further object of the present invention is to reduce the stickiness of vinylidene chloride copolymer compositions with respect to metal surfaces in contact with the material during its processing.

SUMMARY OF THE INVENTION

It has been discovered that certain fatty acid derivatives, in particular fatty acid derivatives of castor oil, provide a more thermally stable PVDC resin and a PVDC polymer or copolymer film having improved oxygen barrier properties. Although castor oil fatty acids have been found to be especially useful, fatty acids derivatives from other sources may be used. The fatty acids include both saturated carboxylic acids, such as those having 16 carbon atoms, like stearic acid, and unsaturated carboxylic acids such as those having 18 carbon atoms, like oleic acid, linoleic acid and ricinoleic acid. The fatty acid stabilizer may be added in amounts up to about 4.0% by weight.

Metal soaps of ricinoleic acid has been shown to be a particularly effective plasticizer/stabilizers. While ricinoleic acid is a preferred material, it should be understood that other fatty acids may be used. The fatty acid may be used as a metal soap. Other fatty acid derivatives include such variety of stabilizers as n-(2-hydroxyethyl)-12 hydroxy stearamide or propylene glycol mono-ricinoleate, for example.

In a preferred use, it was found that the addition of a metal soap of ricinoleic acid, such as calcium ricinoleate to a blend of vinylidene chloride polymer or copolymer provides a more firmly stable and more easily processed resin composition. The use of up to 2.0% of calcium ricinoleate in PVDC copolymers allows the blend to be heated at normal processing conditions for a considerably longer period of time before any sticking occurs than without the calcium ricinoleate soap.

Another advantage of the present invention is that the use of the fatty acid derivatives enables one to reduce the level of epoxidized soybean oil added to the resin composition by as much as 50% and improve the oxygen barrier properties by 50%.

The present invention also provides for a multi-layer extrudable polymeric film comprising first and second surface layers and a PVDC barrier layer between the surface layers. The PVDC barrier layer comprises from about 0.01% to about 2.0% by weight of a metal soap of ricinoleic acid and the balance being at least one vinylidene chloride copolymer wherein the major portion is vinylidene chloride. Optionally, the PVDC barrier layer may contain up to about 4% by weight of an acrylic copolymer, which preferably may be a butyl acrylate/methyl methacrylate/styrene polymer or butyl acrylate/butyl methacrylate/methyl methacrylate polymer. The surface layers may comprise polyolefin materials.

The invention also provides a process for extruding the multi-layer film having a PVDC barrier layer. Optionally, the process includes irradiating the multi-layer film by electron beam at a dosage up to about 6.0 MR with minimal or no damage to the PVDC barrier layer.

DETAILED DESCRIPTION OF THE INVENTION

The present invention is an improved polyvinylidene chloride oxygen barrier film. The film is normally extruded as copolymers of polyvinylidene chloride with methyl methacrylate, polyvinylchloride or acrylonitrile.

It has been surprisingly discovered that the addition of a fatty acid derivatives during film formation provides several improvements to extrusion of polyvinylidene chloride copolymers and films produced thereby. The fatty acid derivatives are preferably castor oil derivatives. Ricinoleic acid is readily available as the main fatty acid from the hydrolysis of caster oil. The fatty acids is preferably used in the form of a metal soap. It is effective added to the resin in amounts up to about 4.0% by weight. In particular, the addition of from about 0.01% to about 2.0% by weight of calcium ricinoleate is preferable. Another preferred ricinoleic acid is propylene glycol monoricinoleate. The enhanced thermal stability allows reduction of conventional plasticizers/stabilizers, the reduction of which improves barrier properties.

Other fatty acids include saturated fatty acids such as stearic acid. In particular, 12-hydroxystearic acid, the hydrogenated counterpart of ricinoleic acid produced from castor oil. More specifically, n-(2-hydroxyethyl)-12 hydroxy stearamide has been found to be especially effective. Fatty acids from sources other than castor oil are useful such as unsaturated carboxylic acids like oleic acid and linoleic acid.

Common methods for determining overall thermal stability for extrusion of vinylidene chloride copolymer blends with plasticizers and stabilizers involve working the blend between a pair of heated rollers or inside a heated mixing chamber. The time required for shear and temperature-induced degradation to produce a noticeably blackened polymer is a measure of effectiveness of a plasticizer/stabilizer combination in promoting heat stability. Commercially acceptable vinylidene chloride copolymer plasticizer/stabilizer compositions should show thermal stability times of 10–15 minutes in a mixing chamber such as a Brabender® blender running at 335° F. and 63 revolutions per minute.

In another embodiment of this invention, it has been found that the addition of approximately 2% by weight of acrylate copolymer to a blend of 2% by weight of epoxidized oil and 96% vinylidene chloride copolymer will in most cases maintain or improve the thermal stability of the composition (all weight percents herein are weight percents of the final blended composition), compared with a composition of 4% by weight of epoxidized oil and 96% vinylidene chloride copolymer.

Thus, in one aspect, the present invention is an extrudable vinylidene chloride polymeric composition comprising 1% to 4% acrylate copolymer and 1 to 2% plasticizer, especially epoxidized soybean oil, with the balance comprising one or more vinylidene chloride copolymers and up to about 2% calcium ricinoleate or other castor oil derivative. Preferred acrylate copolymers include butyl acrylate/methyl methacrylate/styrene polymers and butyl acrylate/butyl methacrylate/methyl methacrylate polymers. A preferred plasticizer is epoxidized soybean oil. Other useful plasticizers include epoxidized linseed oil, epoxidized alpha olefin, epoxidized ester, tetraethylene glycol di(2-ethylhexoate).

In another aspect, the present invention is a multi-layer polymeric film comprising first and second surface layers with a vinylidene chloride copolymer layer disposed between said surface layers in which the vinylidene chloride copolymer layer includes the materials as specified above. The surface layers may be a polyolefin material. Preferable among the polyolefin materials are ethylene/vinyl acetate copolymer, branched low density polyethylene, linear low density polyethylene and very low density polyethylene.

In still another aspect, the present invention is a method of making a film comprising mixing epoxidized soybean oil with vinylidene chloride copolymer; blending the resulting mixture with acrylate copolymer; and thereafter extruding a film from the mixture.

Still other aspects of the present invention include irradiation of a multi-layer film employing acrylate/styrene in the PVDC layer as specified above to cross-link the cross-linkable layers. Such cross-linkable layers may be surface layers or internal layers in addition to the PVDC layer. Optionally, the multilayer film may be stretch oriented to make it heat shrinkable either before or after irradiation.

Irradiation of the multilayer film or a portion thereof may be accomplished by the use of high energy electrons. The irradiation source can be any electron beam generator operating in a range of about 150 kilovolts to about 6 megavolts with a power output capable of supplying the desired dosage. The voltage can be adjusted to appropriate levels which may be, for example, 1,000,000 or 3,000,000 or 6,000,000 or higher or lower. Many apparatus for irradiating films are known to those of skill in the art. The irradiation is usually carried out at a dosage up to about 6 megarads (MR), typically between about 0.5 MR and about 6.0 MR, with a preferred dosage range of about 1 MR to about 4 MR. Irradiation can be carried out conveniently at room temperature, although higher and lower temperatures, for example, 0° C. to 60° C. may be employed.

DEFINITIONS

As used herein, the following terms are understood to have the meaning set forth below:

"Polymer" means the product of polymerization and includes but is not limited to homopolymers, monopolymers, copolymers, interpolymers, terpolymers, block copolymers, graft copolymers, and addition copolymers.

"Plasticizer" means a substance or material incorporated in a film or film layer to increase the flexibility, workability, or extrudability of the film. These substances include both monomeric plasticizers and polymeric plasticizers and are generally those material which function by reducing the normal intermolecular forces in a resin thus permitting the macromolecules to slide over one another more freely.

"Oriented" or "Orientation" refer to the process of stretching a hot plastic article followed by rapidly cooling while in the stretched condition to realign a molecular configuration thus improving mechanical properties. Stretching in one direction is called uniaxial orientation and in two directions is called biaxial orientation. In thermoplastic flexible films which have been oriented there is an internal stress remaining in the plastic sheet which can be relieved by reheating the sheet to a temperature above that at which it was oriented. Thus "oriented" flexible films are "heat-shrinkable" flexible films, and the terms "oriented" and "heat-shrinkable" are used interchangeably herein.

An "oriented" or "heat shrinkable" material is defined herein as material which, when heated to an appropriate temperature above room temperature (for example 96° C.), will have a free shrink of about 5% or greater in at least one linear direction as per ASTM D 2732.

"Vinylidene chloride polymer" or "vinylidene chloride copolymer" or "saran" or "PVDC" means vinylidene chloride copolymerized with at least one other monomer which includes, but is not limited to, vinyl chloride, $C_1$ to $C_8$ alkyl acrylates *such as methyl acrylate), $C_1$ to $C_8$ alkyl methacrylates and acrylonitrile. As abbreviations employed here, PVDC is used to designate copolymers of vinylidene chloride, PVDC-MA designates vinylidene chloride/methyl acrylate copolymer and PVDC-VC1 designates vinylidene chloride/vinyl chloride copolymer.

As used herein the term "extrusion" or the term "extruding" is intended to include co-extrusion, extrusion coating, or combinations thereof, whether by tubular methods, planar methods, or combinations thereof.

"Barrier" refers to a property in thermoplastic materials which indicates that the particular material has a very low permeability to gases, such as oxygen. The principal barrier materials referred to herein are the vinylidene chloride copolymers designated as "PVDC".

The following examples are intended to illustrate the preferred embodiments of the invention and comparisons thereto.

MATERIALS EMPLOYED IN EXAMPLES

| Designation | Description |
| --- | --- |
| PVDC(1) | A copolymeric vinylidene chloride with methyl acrylate sold by DOW Chemical Company as MA 134. It is about 8.5% MA by weight. |
| PVDC(2) | A VDC/VC1 saran with % VDC/% VC 1 = 73.2–79.4/26.8–20.6 from Solvay Polymers, Houston, Texas |
| ESO | Epoxidized soybean oil sold by Ferro as Plas-Check 775. |
| P710 | Methyl Methacrylate/Butyl acrylate/styrene polymer by Atochem Elf sold as Metablen P710. |
| L1000 | Butyl acrylate/methyl methacrylate/butyl methacrylate by Elf Atochem sold as Metablen L1000. |
| CaR | Calcium Ricinoleate from Caschem, Inc. |
| Paricin 220 | n-(2-hydroxyethyl)-12 hydroxy stearamide from Caschem, Inc. |
| Flexiricin 9 | Propylene glycol mono-ricinoleate from Caschem, Inc. |

EXAMPLE 1

Samples of a copolymer of vinylidene chloride polymer were mixed with a plasticizer and/or stabilizer in a Brabender® Torque Rheometer mixing chamber at a bowl temperature of 335° F. The PVDC polymers are designated in the table of materials as shown above.

The driven roll speed was 63 RPM. The test samples were 60 grams made up in a lab batch blender. The thermal stability was measured at the time of cross-linking. The results are summarized in Table 1 below.

TABLE 1

| | INGREDIENTS (WEIGHT %) | | | | THERMAL STABILITY |
| --- | --- | --- | --- | --- | --- |
| SAMPLE | PVDC | ESO | P710 | CaR | (Minutes) |
| CONTROL | 96[1] | 2 | 2 | — | 21 |
| 1 | 95.5[1] | 2 | 2 | 0.5 | 30 |
| 2 | 95[1] | 2 | 2 | 1.0 | 34 |
| 3 | 94[1] | 2 | 2 | 2 | 34 |
| 4 | 92[1] | 2 | 2 | 4 | 34 |
| 5 | 96[2] | 2 | — | — | 25.0 |
| 6 | 95.5[2] | 2 | 2 | 0.5 | 34.0 |
| 7 | 96[1] | 2 | 2[3] | — | 35.0 |
| 8 | 95.5[1] | 2 | 2[3] | 0.5 | 42.0 |

As can be seen from samples 1–3, with the addition of calcium ricinoleate the thermal stability increased. The addition of 4% calcium ricinoleate (sample 4) appeared to over lubricate and no additional thermostability gain beyond 1% was observed. Samples 6 and 8 illustrate the increase in thermal stability using calcium ricinoleate over compositions (samples 5 and 7) not including calcium ricinoleate.

EXAMPLE 2

Samples of a copolymeric vinylidene chloride and methyl acrylate (MA134) were mixed with ESO and various caster oil derivatives to determine their effect on thermal stabilization and oxygen transmission. Samples were made up in a lab batch blender and mixed in a Brabender® mixing chamber. The thermal stability was measured at the time of cross-linking. The results of the thermostability test are shown in Table 2 below.

TABLE 2

| Sample | Ingredients (Weight %) | | | Thermal Stability (Minutes) |
| --- | --- | --- | --- | --- |
| | PVDC | ESO | Plasticizer | |
| 1 | 96.0 | 4.0 | — | 35.0 |
| 2 | 96.0 | 2.0 | 2.0$^{(1)}$ | 34.0 |
| 3 | 96.0 | 2.0 | 2.0$^{(2)}$ | 45.0 |
| 4 | 97.0 | 2.0 | 1.0$^{(2)}$ | 40.0 |
| 5 | 96.0 | — | 4.0$^{(3)}$ | 55.0 |
| 6 | 96.0 | 2.0 | 2.0$^{(3)}$ | 49.0 |

Notes:
$^{(1)}$Calcium Ricinoleate
$^{(2)}$Paricin 220
$^{(3)}$Flexiricin 9

When using the calcium ricinoleate as a plasticizer (sample 2) the sample had comparable thermal stability but the calcium ricinoleate sample had 50% lower oxygen transmission rate than sample 1 without calcium ricinoleate. This means that the thickness of the PVDC barrier layer may be reduced and still be an effective oxygen barrier. The results also show that the stearamide (samples 3–4) was an effective stabilizer. The two stearamide samples had 50% low oxygen transmission rate than the PVDC film without stabilizer. Samples 5 and 6 possessed superior thermal stability and had equal oxygen transmissions than sample 1.

Although illustrated embodiments of this invention have been described in detail hereinabove with reference to the accompanying drawings, it is to be understood that the invention is not limited to those precise embodiments, and that various changes and modifications may be readily affected by persons of ordinary skill without departing from the spirit or scope of the invention being set forth in the following claims.

What is claimed is:

1. A multilayer film comprising an oxygen barrier layer comprising (i) polyvinylidene chloride, (ii) from about 0.01 to about 4 weight percent of at least one member selected from the group consisting of ricinoleic acid, calcium ricinoleate, n-(2-hydroxyethyl)-12 hydroxy stearamide, and propylene glycol mono-ricinoleate, and (iii) up to about 2 weight percent of a plasticizer, said oxygen barrier layer being an inner layer of said film.

2. The film according to claim 1 wherein component (ii) of said oxygen barrier layer comprises at least one member selected from the group consisting of ricinoleic acid and a metal soap of ricinoleic acid.

3. The film according to claim 1 wherein component (ii) of said oxygen barrier layer comprises ricinoleic acid and calcium ricinoleate, wherein the calcium ricinoleate is present in an amount of from about 0.1 to 2 weight percent, based on the weight of the barrier layer.

4. The film according to claim 1, wherein the film is biaxially oriented and heat shrinkable.

5. The film according to claim 1, wherein the film comprises polymer irradiated with a dosage up to about 6 MR.

6. The film according to claim 1, wherein the plasticizer comprises at least one member selected from the group consisting of epoxidized soybean oil, epoxidized linseed oil, epoxidized alpha olefin, epoxidized ester, and tetraethylene glycol di (2-ethylhexoate).

7. The film according to claim 6, wherein the plasticizer is present in the barrier layer in an amount of from 1 to 2 weight percent, based on the weight of the barrier layer.

8. The film according to claim 1, wherein the barrier layer further comprises an acrylate copolymer in an amount up to about 4 weight percent, based on the weight of the barrier layer.

9. The film according to claim 8, wherein the acrylate copolymer comprises butyl acrylate/methyl methacrylate copolymer.

10. The film according to claim 9, wherein the acrylate copolymer comprises at least one member selected from the group consisting of butyl acrylate/butyl methacrylate/methyl methacrylate copolymer and butyl acrylate/methyl methacrylate/styrene copolymer.

11. The film according to claim 1, wherein the film further comprises a first outer layer and a second outer layer, said oxygen barrier layer being disposed between said outer layers.

12. The film according to claim 11, wherein said outer layers each comprise polyolefin.

13. The film according to claim 12, wherein said polyolefin comprises at least one member selected from the group consisting of ethylene/vinyl acetate copolymer, branched low density polyethylene, linear low density polyethylene, and very low density polyethylene.

14. The multilayer film according to claim 11, wherein the film is biaxially oriented and heat shrinkable.

15. The film according to claim 11, wherein the film comprises polymer irradiated with a dosage up to about 6 MR.

16. The film according to claim 11, wherein a major portion of the oxygen barrier layer is polyvinylidene chloride, and wherein component (ii) is present in an amount of from about 0.01 to 4.0 weight percent, based on the weight of the barrier layer.

17. The film according to claim 16 wherein component (ii) of said oxygen barrier layer comprises ricinoleic acid and calcium ricinoleate, wherein the calcium ricinoleate is present in an amount of from about 0.1 to 2 weight percent, based on the weight of the barrier layer.

18. The multilayer film according to claim 11, wherein the plasticizer comprises at least one member selected from the group consisting of epoxidized soybean oil, epoxidized linseed oil, epoxidized alpha olefin, epoxidized ester, and tetraethylene glycol di (2-ethylhexoate).

19. The film according to claim 11, wherein the barrier layer further comprises an acrylate copolymer in an amount up to about 4 weight percent, based on the weight of the barrier layer.

* * * * *